United States Patent [19]

Busch

[11] 4,038,801
[45] Aug. 2, 1977

[54] DEVICE FOR CONNECTING PARTS ON WALLS AND CEILINGS

[76] Inventor: Günter Busch, Budericher Strasse 11, 5 Cologne 60, Germany, 5

[21] Appl. No.: 645,872

[22] Filed: Dec. 31, 1975

[30] Foreign Application Priority Data

Jan. 3, 1975 Germany .............................. 2500214
July 10, 1975 Germany .............................. 2530854

[51] Int. Cl.² ............................................. E04B 1/38
[52] U.S. Cl. .................................... 52/698; 85/9 R; 85/50 C
[58] Field of Search ....................... 52/698, 701, 708; 85/1.5 R, 9 R, 50 C; 403/56, 57, 90

[56] References Cited

U.S. PATENT DOCUMENTS

| 2,255,661 | 9/1941 | Greenslade | 85/1.5 R |
| 2,874,749 | 2/1959 | Brink | 85/50 C X |
| 3,108,404 | 10/1963 | Lamb | 52/708 X |
| 3,313,197 | 4/1967 | Knohl | 85/9 R |
| 3,318,622 | 5/1967 | Crumpler | 85/9 R |

FOREIGN PATENT DOCUMENTS

| 1,556,381 | 12/1968 | France | 85/50 C |
| 614,656 | 6/1935 | Germany | 52/701 |
| 1,025,605 | 3/1958 | Germany | 52/698 |

Primary Examiner—J. Karl Bell
Attorney, Agent, or Firm—Walter Becker

[57] ABSTRACT

A device for connecting parts on walls and ceilings according to which a screw with a screw head has within the region of the screw head detachably connected thereto a plate while the screw is rotatable relative to the plate.

10 Claims, 19 Drawing Figures

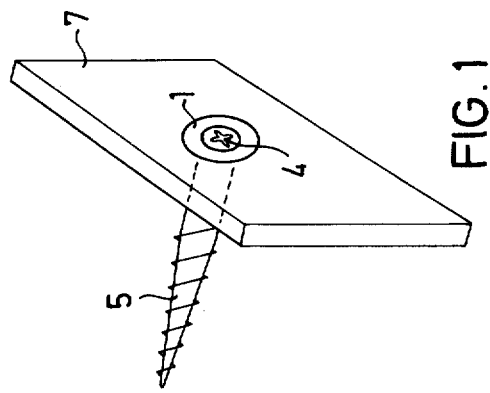
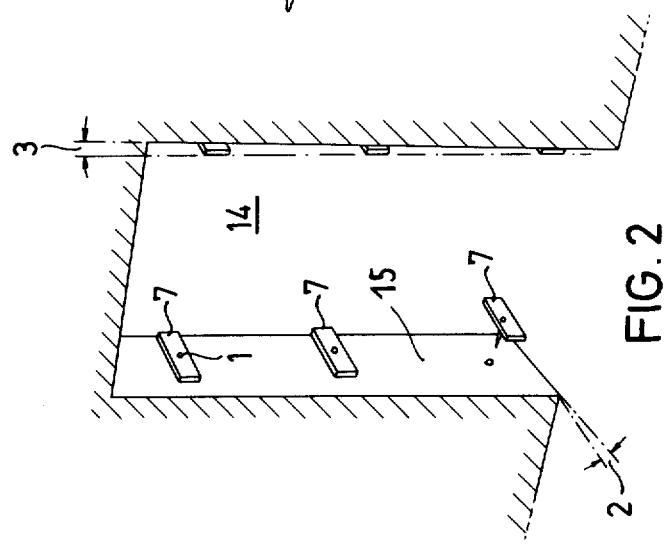

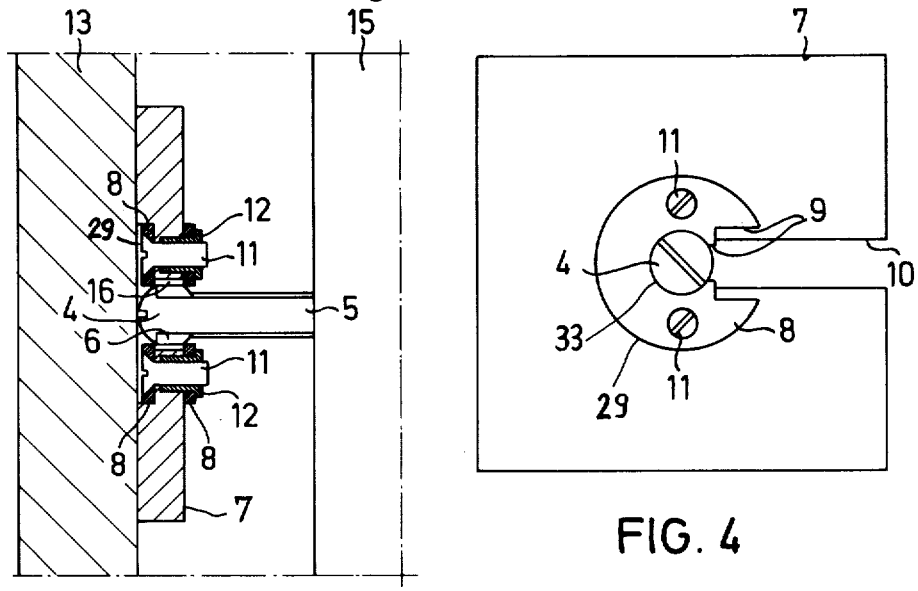
FIG. 3
FIG. 4
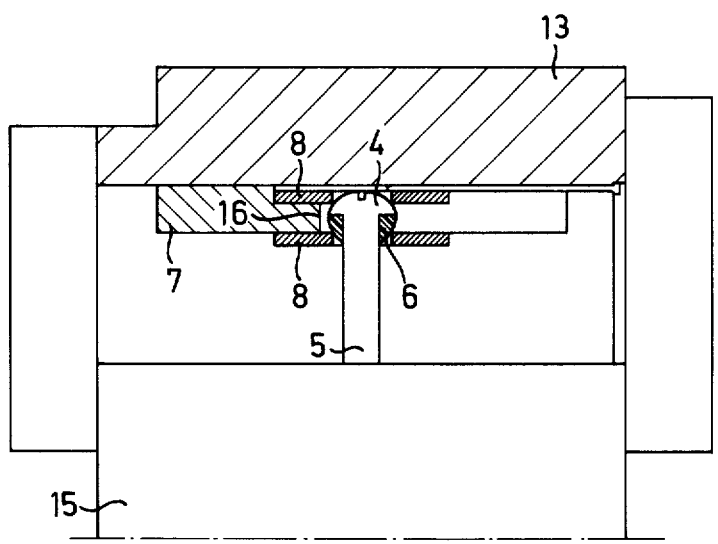
FIG. 5

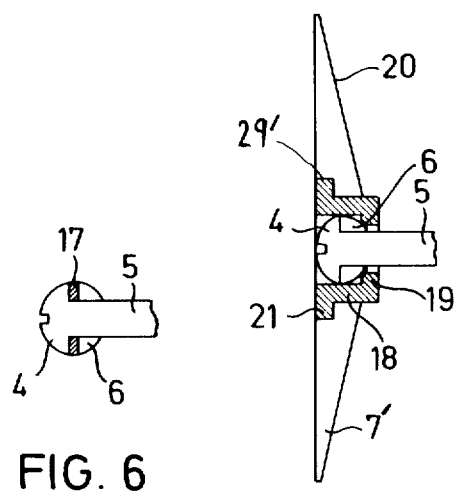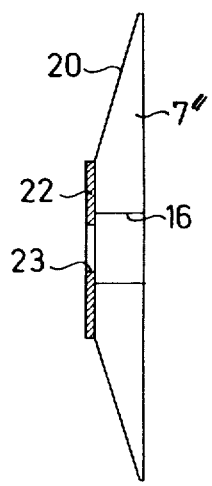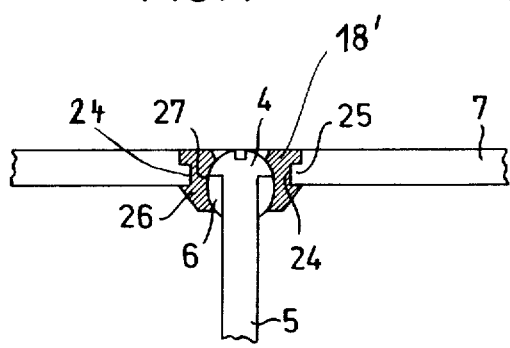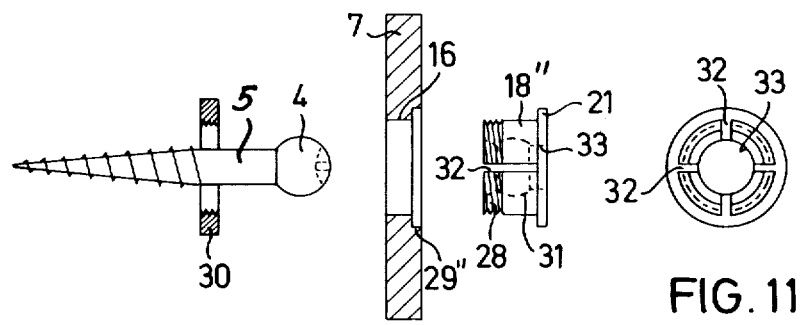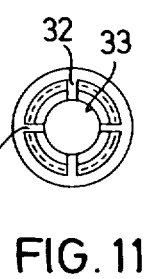
FIG. 6
FIG. 7
FIG. 8
FIG. 9
FIG. 10
FIG. 11

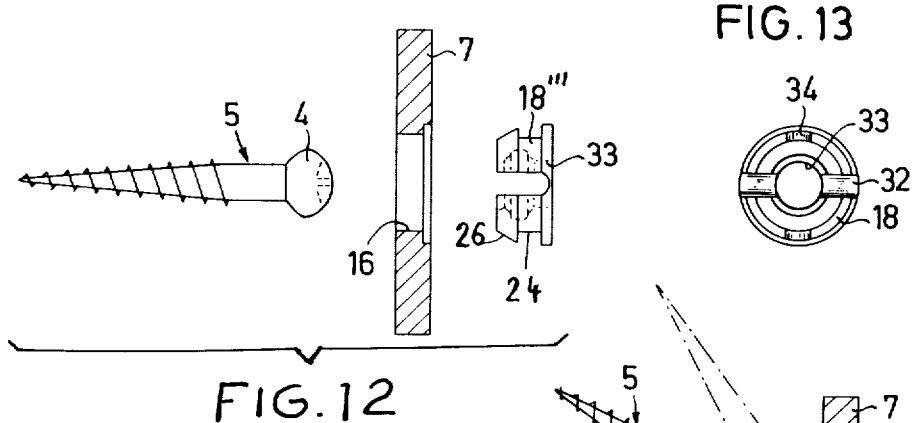
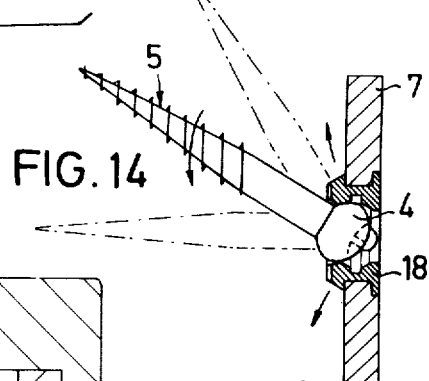
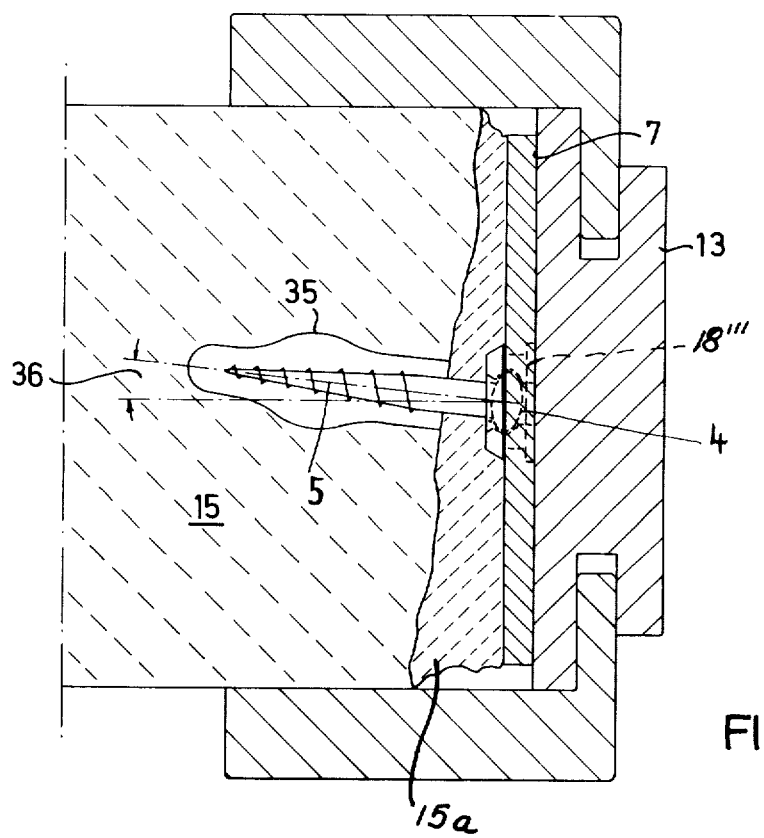

DEVICE FOR CONNECTING PARTS ON WALLS AND CEILINGS

The present invention relates to a device for connecting elements to walls or ceilings, for instance, for connecting wooden frames in the openings of masonry walls, The device, however, is also suitable for connecting wall and ceiling coverings.

A device for connecting wooden frames in an opening of a masonry wall has become known which comprises primarily a round plywood plate in the center of which there is non-detachably connected a wood screw. This wood screw serves for connecting the device in the opening of a masonry wall and is glued to the plywood plate.

Inasmuch as a good connection of the surface of the plywood plate on the side of the frame with the frame by gluing is assured only when the surfaces to be glued to each other are precisely parallel to each other, it is necessary that the plywood plates are so mounted that they will meet this requirement. Inasmuch as the wood screws are rigidly connected to the plywood plates while forming a right angle with the plywood plates, the bores have to be precisely perpendicular to the door soffit. Inasmuch as this is not possible in many instances, relatively thin screws have to be used so that the same after having been screwed in can be bent into the required position in conformity with the desired distance. During this bending operation it frequently occurs that the seat of the screw is loosened in the dowel. Inasmuch as furthermore with aerated cement and plaster walls dowels or pegs of a larger diameter have to be used in order to realize the desired strength conditions, in other words also screws with larger diameter are required, the heretofore known device cannot be used with walls of this type. Other drawbacks are encountered due to the face that the fixed connection of screw and plywood plate represents a bulky element which for storing and transporting purposes requires a relatively large space.

It is, therefore, an object of the present invention to provide a device of the above described general character by means of which in a simple manner a safe connection of the parts to be connected can be realized and which when being stored and transported requires only little space.

This object and other objects and advantages of the invention will appear more clearly from the following specification in connection with the accompanying drawings, in which:

FIG. 1 represents an isometric view of a device according to the invention.

FIG. 2 illustrates in an isometric view a recess in a wall for a door with a plurality of devices according to the invention.

FIG. 3 shows a longitudinal section of a first embodiment of the device according to the invention in built-in condition.

FIG. 4 represents a front view of the device of FIG. 3.

FIG. 5 is a section through the device of FIG. 3 which section is offset by 90° with regard to FIG. 3.

FIG. 6 shows the design of a screw head in conformity with the present invention.

FIG. 7 represents a section through a second embodiment of the device according to the invention.

FIG. 8 illustrates in section a third embodiment of the device according to the invention but turned by 180°.

FIG. 9 is a diagrammatic section through a fourth embodiment of a device according to the invention.

FIG. 10 is an explosive view of a fifth embodiment of the device according to the invention.

FIG. 11 shows the bushing of FIG. 10 offset by 90° relative to the showing of FIG. 10.

FIG. 12 is an explosive view of a sixth embodiment of the device according to the invention.

FIG. 13 shows the bushing of FIG. 12 offset relative to the showing of FIG. 12 by 90°.

FIG. 14 diagrammatically illustrates in section the insertion of the screw into the bushing arrangement in the wooden plate, FIG. 15 is a section through the device of FIG. 14 in built-in condition.

Figure 16:
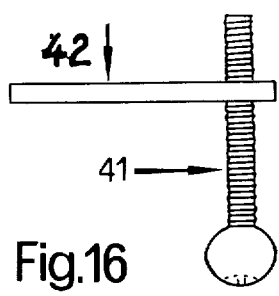

FIG. 16 shows in side view a portion of a device according to the invention which comprises a screw and a fish-plate.

Figure 17:
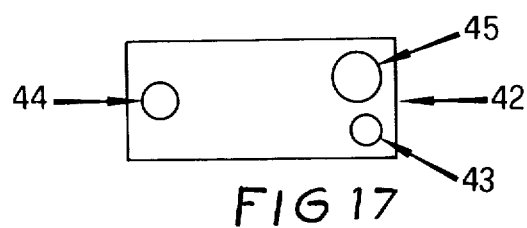

FIG. 17 shows the fish-plate of FIG. 16 in top view.

Figure 18:
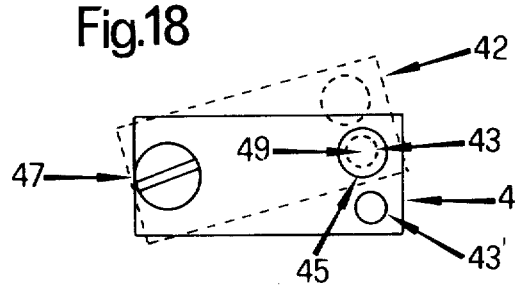

FIG. 18 illustrates in top view the fish-plate of FIG. 16 in two different positions.

Figure 19:
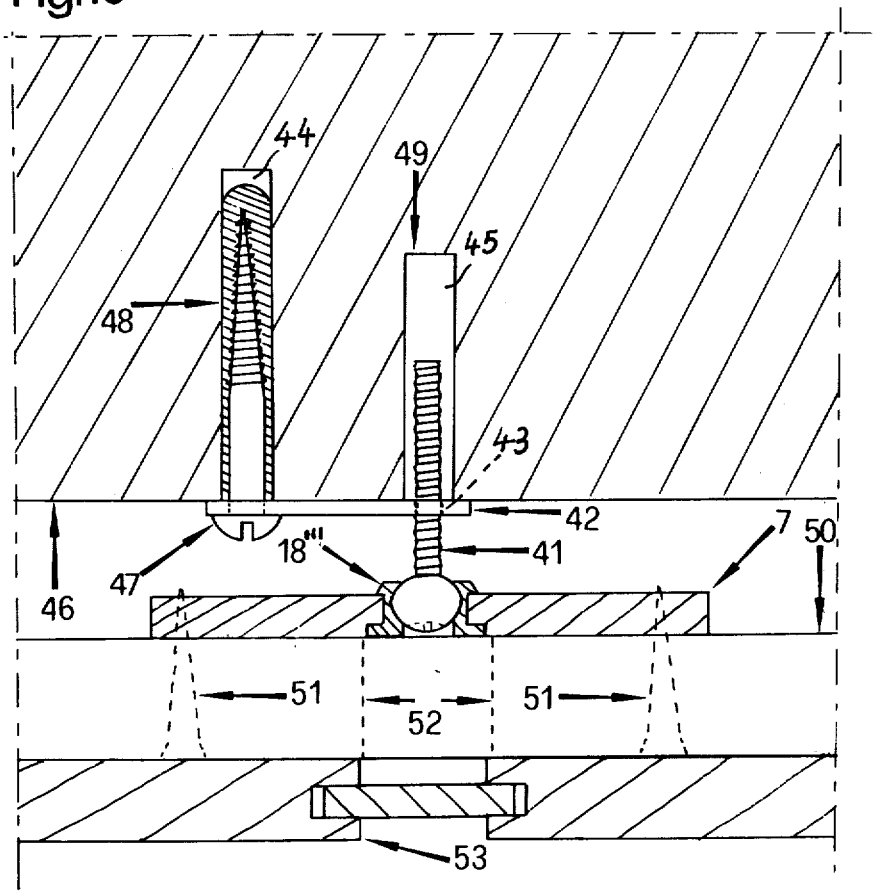

FIG. 19 illustrates in longitudinal section an example for the employment of the device according to the invention.

The device according to the present invention for connecting elements to walls or ceilings, which comprises a screw and within the region of the screw head also comprises a plate, is characterized primarily in that the screw is detachably connected to the plate, and that the screw is turnable relative to the plate.

The device according to the invention has the advantage that, due to the fact that the screw has to be aligned with the plate only when actually being used, the parts can be stored and transported separately so that only little space is required. Moreover, due to the rotatable arrangement of the screw relative to the plate it will be possible to turn the screw even if the parts to be connected have already been connected to the plate, in other words it is still possible to turn the screw and thus to change the distance between the plate and the ceiling or wall.

According to a further development of the invention, the screw is pivotable relative to the plate. In this way it will be possible to align the plate even when the dowel or peg for the screw is inserted at an angle into the ceiling or into the wall. The pivotability of the screw relative to the plate is expediently brought about by designing the screw head spherical. In this way a pivotability in all directions will be assured.

The bearing for the ball-shaped screw head is formed by two discs which are braced relative to each other while the plate and the discs comprise a lateral slot for the introduction of the screw.

According to the preferred embodiment of the invention, the bearing for the screw head is formed by a correspondingly shaped bushing which is inserted into the plate. The bushing consists expediently of an elastic material. In order to facilitate the insertion of the bushing into the plate, the bushing is provided with at least one slot the length of which is less than the height of the bushing. The slot permits a compression of the bushing during the insertion thereof.

Depending on the purpose of employment for which the device is provided, a certain type of screw may be selected. For the connection of frames or a framework in the opening of a masonry wall, the screw is according to a further development of the invention a wood screw. According to another feature of the invention, the screw is a machine screw. This embodiment is suitable in particular for connecting wall and ceiling coverings.

According to a further development of the invention which is particularly suited for the connection of wall and ceiling coverings, the machine screw is screwed into a threaded bore of a fish-plate which comprises a second bore for connecting the fish-plate to the wall or ceiling.

According to a still further feature of the invention, the fish-plate in addition to the threaded bore has a third bore the diameter of which is larger than the diameter of the machine screw and which is spaced from the second bore by the same distance as the threaded bore. This threaded bore serves as gauge for starting a bore in the wall or in the ceiling into which that end of the machine screw is introduced which projects from the fish-plate.

Referring now to the drawings in detail, the device according to FIG. 1 comprises a wooden plate 7 and a screw 5 which latter has its head 4 held in the wooden plate 7 by means of a pivot bearing 1. FIG. 2 shows how the device according to the invention is employed. The wall 15 has left free therein a recess 15 for a door, the frame of which is to be connected to the wall. In order to realize this, a plurality of bores is bored into the wall into which dowels or pegs are inserted. The screws 5 of the device of FIG. 1 are inserted and screwed into said dowels or pegs, said head 4 of screw 5 being rotatable relative to the wooden plate 7. The horizontal angle deviation 2 or vertical angle deviation 3 occuring in view of a non-precise bricking-up of the walls can be compensated for by means of the pivot bearing 1. To this end, by means of a water level and/or a plumb, the wooden plates 7 are aligned so as to be precisely flush with one plane so that the door frame can be connected thereto by gluing without any defects.

According to the first embodiment of the invention illustrated in FIGS. 3–5, the pivot bearing 1 is designed as ball bearing. In the wooden plate 7, a slot 10 is provided which extends from the marginal side to the center and ends in a bore 16. In plate 7, at the side of the door frame 13 to be glued on, there is provided a recess 29 into which a clamping disc 8 is inserted. Countersunk screws 11 are introduced into bores arranged opposite to each other and provided in the clamping disc 8 on the frame side. These screws 11 are threadedly engaged by sleeve nuts 12 which hold a further clamping plate 8. As will be seen from FIG. 4, each clamping plate 8 has a lateral slot 9 which with the illustrated embodiment is stepped and ends in a bore. The slot 9 is aligned with a slot 10 in the wooden plate 7 so that a screw 5 is insertable through said slots between the loose clamping plates 8 into the bore 16. The screw 5 has a spherical head which is formed by the round head 4 of a commercial screw and by the head portion 6 which head portion is placed upon the screw shank while the section of said head portion 6 on the wall side forms an image of the calotte surface of the head 4. The head portion 6 is expediently made of hard polyvinyl chloride.

FIG. 6 shows the shape of the screw head in detail while the two calotte sections, the screw head 4 and the head portion 6 are arranged so that their base surfaces are located offset to each other. This ball head, the cylindrical section of which is formed by the rim portion of disc 17 and is arranged coaxially with play in bore 16 (FIGS. 3–5) is overlapped at the calotte outer sides by clamping rings 8. In this way a ball joint is formed which permits a limited pivoting of the shank of screw 5. The said pivot position can be fixed by tightening the countersunk screws 11 in said sleeve nuts 12.

According to the embodiment of the screw shown in FIG. 6, the disc 17 arranged between the screw head 4 and the head portion 6 consists of rubber but it is to be understood that also a resilient metal disc may be provided instead.

The embodiment of the device according to FIG. 7 has been simplified over the embodiment of FIGS. 3–5 by omitting the clamping discs and their screw connections. Instead, a bushing 18 of elastic material, for instance a synthetic material, is arranged in the bore 16 provided in wooden plate 7'. Wooden plate 7' has a recessed plate 29 in which an outer annular flange 21 of bushing 18 is so inserted that its outer side is flush with the outer surface of the wooden 7'. That end of bushing 8 which is located opposite the outer annular flange 21 has an inner annular flange 19 (FIG. 7) which projects beyond the wooden plate 7' on the wall side. Screw 5 has its head inserted in bushing 18 with a slight press fit in such a way that it is pivotable in all directions as far as will be permitted by the play between the shank of screw 5 and the inner annular flange 19 of bushing 18.

The embodiment illustrated in FIG. 8 is furthermore simplified by the fact that instead of the bushing 18 on the wall side there is only a sheet metal disc 12 connected to the wooden plate 7' which latter has an opening 23 that is smaller than the opening 16 in the wooden plate 7'. With the screw head inserted, also this arrangement permits a pivoting of screw 5 relative to the wooden plate 7' while the fixing of the set position of the screw 5 relative to the wooden plate 7' is effected only during the gluing operation.

With the embodiment illustrated in FIGS. 7 and 8, the surface of plate 7' on the wall side is toward the outside provided with an inclination 20 so that it tapers toward the outer rim of the plate 7' whereby at the outer rims of the wooden plate 7', clamps and wedges are insertable.

According to the embodiment illustrated in FIG. 9, the bushing 18' is provided with circumferential recess 24 on the outside which has associated therewith a circumferential rim 25 on the wooden plate 7 so that the bushing 18' after being pressed into the wooden plate is held by engagement of recess 24 with the circumferential rim 25. According to the embodiment of FIG. 9, the head portion 6 is so designed that together with the round head 4 of screw 5 it forms a ball which projects from one side of the screw shank. On the wall side, the bushing 18' has a section 26 which projects beyond the wooden plate 7 and which is elastically deformed when the spherical head of screw 5 is pressed in. Screw 5 is with this embodiment pivotable relative to wooden plate 7 in response to the application of a certain force.

The embodiment of the device illustrated in FIGS. 10 and 11 comprises a screw 5, the head 4 of which forms one piece and is spherical. The wooden plate 7 has a bore 16 which extends all the way through and is provided with an outer recess 29 for the outer annular flange 21 of bushing 18". That end of the bushing 18" which is located opposite the outer annular flange 21 is provided with an outer thread 28. The bushing 18" which consists of elastic material has that end which is provided with the outer thread 28 provided with four axis parallel slots 32 which are spaced from each other by a distance of 90° which extend to the outer annular flange 21. The opening 33 in bushing 18" starts from the end of the outer annular flange 21. In the interior of bushing 18''', opening 33 widens first up to a maximum diameter and then decreases again so that in the axial section, the widening and narrowing is effected along a circular arc. The narrowed section is then followed by a section which in axial direction conically widens toward the end.

The assembly of the device is carried out in such a way that screws 5 with its head 4 is first pressed into the bushing 18'' while the sections of the bushing wall which are separated by slots 32 widen elastically, In view of the elastic return forces, the individual sections of the bushing wall subsequently assume their original position so that now the wooden plate 7 with its opening 16 can be positioned on bushing 18'' while the outer annular flange 21 is so introduced into recess 29 that its outer side is flush with the surface of the wooden plate 7 on the wall side. Due to the face that the opening 16 of wooden plate 7 prevents a widening of the wall of bushing 18'', head 4 of screw 5 is firmly held in bushing 18''. By screwing a nut 30 onto the outer thread 28, the bushing 18'' is eventually fixed. Screw 5 is pivotable in the ball joint which is formed by the screw head 4 in the opening 33 of bushing 18''.

With the embodiment illustrated in FIGS. 12-15, a screw 5 with a spherical head 4 is employed. Bushing 18 has a section 26 projecting beyond the wooden plate 7 and has a circumferential recess 24 so that similar to the embodiment of FIG. 9 it can be pressed into the opening or bore 16 of the wooden plate 7. As will be seen from FIG. 13, the bushing 18''' has on the wall side, i.e. on the side of the projecting section 26, a slot 32 which extends diametrically in axis-parallel manner and which, as will be seen from FIG. 12, extends up to the vicinity of the surface on the wall side. The width of slot 32 is selected in conformity with the dimensions of the associated screw head 4.

Bushing 18''' has an opening 33 which extends all the way through and is provided with different sections. Starting from the end of the wall side, a conical inwardly tapering first section is followed by an axial short conically widening second section which in turn is followed by a third hollow cylindrical section while between the second section and the third section there is formed a radial shoulder. The hollow cylindrical section is followed by a further radial shoulder and an axial short conically tapering fourth section which merges with a hollow cylindrical opening. The outer rim of the above mentioned section 26 has respectively offset by 90° with regard to slot 32 a recess 34 which is in the form of a circular segment.

With this embodiment of the device, the screw 5 is so inserted into wooden plate 7 in which bushing 18''' is inserted, as is illustrated in FIG. 14. The screw 5 is with its head 4 so arranged relative to bushing 18 that the marginal edge of the screw head 4 which edge is formed between the base surface of the calottes, will lie approximately in the center of the slot 32 while the screw shank rests in one of the recesses 34. By exerting pressure upon the screw head 4 while simultaneously pivoting the screw 4 as shown in FIG. 14, the screw head 4 slides into the space formed by the individual sections of openings 33 and is held therein. Screw 5 is, however, rotatable relative to bushing 16 and is pivotable inasmuch as due to the inner shoulders in opening 33 the free space required therefor is created in the hollow cylindrical section.

When screw 5 has been inserted into bushing 18''', the device can be employed as illustrated in FIG. 15. According to FIG. 15, a hole is bored into the wall with the axis of said hole deviating from the horizontal by an angle 36. A dowel or peg 35 is inserted into the hole. A screw 5 of the device of FIG. 14 is screwed into dowel or peg 35. In view of the pivoting of the ball joint formed by head 4 and sections of opening 33 in bushing 16, the wooden plate 7 can independently of the arrangement of the bore be pivoted into the wall 15 in the desired position in which the door frame 13 can be glued to the wooden plate 7. Thereupon, the space between the wall 15 and the wooden plate 7 can be filled in with a hardening filling material 15a, for instance plaster of Paris.

That part of the device according to the invention which is illustrated in FIGS. 16-18 comprise a machine screw 41 and fish-plate 42. Machine screw 41 is screwed into a threaded bore 43 of fish-plate 42. The fish-plate 42 comprises a second bore 44 for a screw 47 (FIG. 19) for connecting the fish-plate 42 to the wall or the ceiling. Adjacent the threaded bore 43 in fish-plate 42 there is provided a third bore 45 the diameter of which is greater than the diameter of the machine screw 41. This third bore 45 which is spaced from the second bore 44 by the same distance as threaded bore 43 serves as gauge for starting a bore 49 (see FIG. 19) in the wall or in the ceiling. More specifically, after the fish-plate 42 has by means of screw 48 (FIG. 19) been connected to the wall or the ceiling, a bore 49 (FIG. 19) is through the third bore 45 drilled into the wall or into the ceiling. Thereupon, the fish-plate 42 is moved into a position indicated in FIG. 18 by a dash line. The machine screw 41 can now be screwed into the threaded bore 43 of fish-plate 42 while that end of the machine screw 41 which passes through the threaded bore 43 is introduced into the hole 49 (see FIG. 19).

The embodiment illustrated in FIG. 19 comprises a ceiling 46 to which by means of screw 47 and dowel 48 there is connected a fish-plate 42. A hole 49 is bored into the ceiling 46 and the projecting end of machine screw 41 is introduced into bore 49. Bore 49 is so deep that the machine screw 41 can be moved into any desired position by screwing the machine screw 41 into or out of bore 49. Thus, the height of the wooden plate 7 can be precisely adjusted. Due to the pivotal mounting of the head of the machine screw 41 in the bushing 18''', the wooden plate 7 precisely adapts itself to the lathing 50. The connection of the lathing 50 to the wooden plate 7 is effected by means of wood screws 51. Within the region of the bushing 18''', the lathing 50 is provided with bores 52. Through these bores 52, the machine screw 41 can by means of a screw driver selectively be moved into and out of the hole 49 in order to move the lathing 50 to the desired level. The assembly of the cover 53 to the lathing 50 is effected. The cover 53 may consist of panels, profiled boards or the like.

It is, of course, to be understood that the present invention is by no means limited to the specific showing in the drawings, but also comprises any modifications within the scope of the appended claims.

What I claim is:

1. A device for connecting and fastening parts to walls and ceilings having a bore therein which can form any suitable angle with respect thereto, which includes in combination: a plate and a screw having said plate detachably connected thereto, said screw having a spherical screw head, and a pivot bearing provided in said plate and releasably connected with said plate, said plate being rotatably and pivotally connected by said pivot bearing relative to said screw within the region of said screw head, said plate being pivotable relative to said screw in every desired direction of movement to provide optimum possibility of adjustment regardless of positioning of the bore.

2. A device in combination according to claim 1, which includes disc means braced against each other and forming a pivot bearing for said screw head.

3. A device in combination according to claim 2, in which said plate and said disc means are provided with a slot for the introduction of said screw into said plate.

4. A device in combination to claim 1, which includes bushing means having its inner surface shaped for engaging and accommodating said screw head to allow the latter and said plate to carry out pivoting movements.

5. A device in combination according to claim 4, in which said bushing means consists of elastic material.

6. A device in combination according to claim 5, in which said bushing means has at least one slot the depth of which is only slightly less than the height of said bushing.

7. A device in combination according to claim 1, in which said screw is a wood screw.

8. A device in combination according to claim 1, in which said screw is a machine screw.

9. In combination with wall means having a surface section to be covered by a plate and also having a first bore and a second bore, starting from said surface section and extending into said wall means, dowel means provided in said first bore of said wall means, a fish-plate having a first bore in axial alignment with said first bore in said wall means, a first screw extending through said first bore in said fish-plate into said dowel and firmly connecting said fish-plate to said surface section, said fish-plate having a threaded bore arranged in at least approximately axial alignment with said second bore in said wall means and having a diameter less than that of said second bore in said wall means, a plate arranged in spaced relationship to said fish-plate, and a machine screw having a head with a spherical surface pivotally connected to said plate and having its threaded shank in adjustable threaded engagement with said threaded bore while extending into said second bore in said wall means.

10. An arrangement according to claim 9, in which said fish-plate has an additional bore having a diameter substantially equalling the diameter of said second bore in said wall means and being spaced from said first bore in said fish-plate by the same distance by which said threaded bore in said fish-plate is spaced from said first bore in said fish-plate.

* * * * *